United States Patent [19]

Brower

[11] 4,074,602
[45] Feb. 21, 1978

[54] DEFECTING SAW

[75] Inventor: Robert W. Brower, Allendale, Mich.

[73] Assignee: C. O. Porter Machinery Company, Grand Rapids, Mich.

[21] Appl. No.: 755,594

[22] Filed: Dec. 30, 1976

[51] Int. Cl.² .................... B23Q 11/06; B27G 19/02
[52] U.S. Cl. .................................. 83/471.2; 83/488;
  361/189; 192/129 A; 83/DIG. 1
[58] Field of Search ............ 83/471.2, DIG. 1, 471.3,
  83/488, 487, 486, 486.1; 425/152; 361/189, 190;
  192/129 A, 131 R

[56] References Cited

U.S. PATENT DOCUMENTS

| | | | |
|---|---|---|---|
| 3,371,254 | 2/1968 | Hagfors | 361/189 |
| 3,910,142 | 10/1975 | Jureit et al. | 83/471.3 |
| 3,946,631 | 3/1976 | Malm | 83/488 |

*Primary Examiner*—Donald R. Schran
*Attorney, Agent, or Firm*—Price, Heneveld, Huizenga & Cooper

[57] ABSTRACT

A defecting or cut off saw inludes a support for boards and a transversely movable rotating saw blade for cutting the boards to length or cutting away defects therein. The transverse movement of the saw blade is controlled by an electrical circuit, the operation of which is acutated by the simultaneous depression of a pair of spaced cycle switches. The control circuit includes a timing circuit permitting movement of the saw across a board only when both of the cycle switches have been operator actuated within a predetermined period of time of one another. The circuit provides infinite stroke control for returning the saw blade to its start position at any time when one of the cycle switches is released.

13 Claims, 2 Drawing Figures

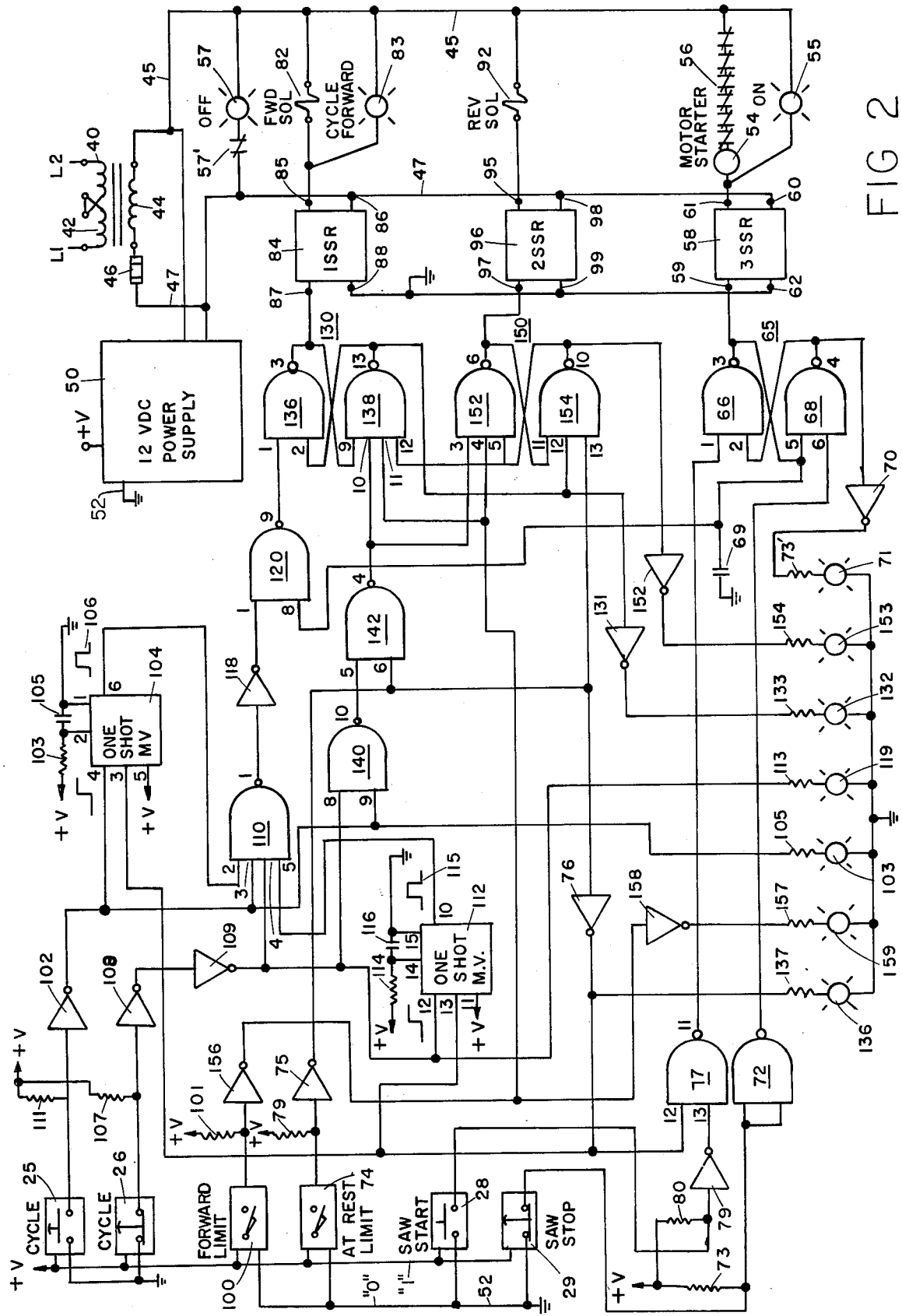

DEFECTING SAW

BACKGROUND OF THE INVENTION

The present invention relates to automated saws.

In operator actuated defecting or cut off saws which typically include a rotating saw blade movable on a carriage to sweep transversely across a board held by a support platform, in order to meet safety requirements typically a pair of spaced hand-operated switches are provided. These switches actuate the saw only when both switches are held down by the operator thereby removing the operator's hands and arms from the immediate sawing area.

Prior art saws of this type, however, permit the operator to defeat the safety feature by, for example, taping one of the switches in a closed position and operating the remaining switch. This, of course, leaves one of the operator's hands free which although facilitating speedier operation of the saw by rapidly feeding of boards into the sawing area, greatly increases the hazard of operation. Further with such prior art saws once the operator actuated switches are depressed, the saw blade proceeds to the end of its travel actuating a limit switch which returns the blade to its starting position. This occurs regardless of the width of the board being cut or whether or not the operator has removed his hands from the push button switches. Such an arrangement proves to be an additional safety hazard by not permitting immediate reversal of the saw blade motion as well as wasting energy since the saw blade frequently continues operation over a distance unnecessary to cut a board.

SUMMARY OF THE INVENTION

The saw of the present invention overcomes the above noted difficulties in the prior art by providing an operator actuated saw in which a pair of spaced push button switches are provided and which must be actuated nearly simultaneously to initiate motion of the saw blade transversely across a board. Further the push button switches must remain depressed to continue the transverse motion of the saw blade and if one or both of the buttons are released, the blade will return to its starting position thereby providing infinite stroke control for the saw.

Saws embodying the present invention include a rotating saw blade and drive motor therefor mounted on a carriage for transverse movement with respect to means for supporting a board in the path of travel of the blade. Moving means are coupled to the carriage for moving the carriage and saw blade transversely. A control circuit coupled to the moving means for its actuation includes a pair of spaced push button switches mounted to the saw for operator actuation. The switches are coupled to a timing and logic circuit for actuating the moving means only when both push buttons are actuated within a predetermined period of time with respect to one another and for moving the saw blade to its start position when one or both of the switches are deactuated.

These and other features of the present invention and its operation can best be understood by reference to the following description thereof in which:

BRIEF DESCRIPTION OF THE DRAWINGS

FIG. 2 is an electrical circuit diagram, partially in block and schematic form, showing the control circuit for the saw of FIG. 1.

DETAILED DESCRIPTION OF THE PREFERRED EMBODIMENT

Figure 1:
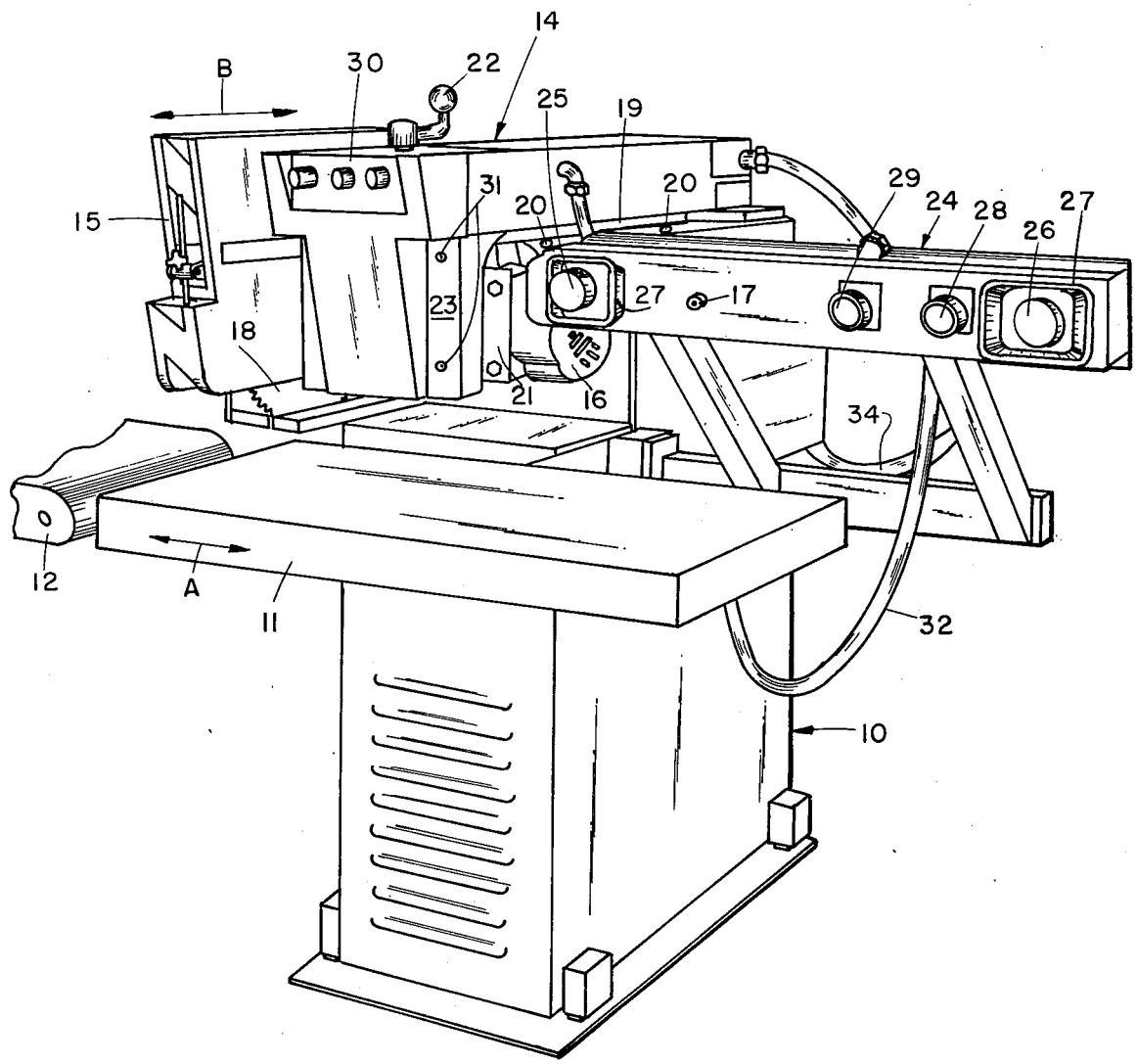
FIG. 1 is a perspective view of a saw embodying the present invention.

Referring now to FIG. 1 there is shown an automated saw embodying the present invention in which, in the preferred embodiment, is employed as a defecting saw. The saw comprises a base assembly 10 for floor mounting and which is conventionally fabricated of steel members surrounded by a cabinet for supporting and protecting the various mechanical elements of the saw. Extending forwardly of and suitably mounted to the base 10 are board support means comprising a platform 11. An input conveyor 12 may conventionally be utilized for feeding boards into the saw area and onto the platform 11 from left to right as indicated by arrow A in FIG. 1.

A carriage assembly 14 movable toward and away from the platform 11 in a direction indicated by arrow B includes an electrical saw motor 16 coupled to a circular saw blade 18 surrounded by a suitable protective shroud 15. Carriage assembly 14 is mounted to the superstructure of base member 10 by means of a suitable sliding interface including a guide rail 19 coupled to the carriage assembly 14 and supported by rollers 20 mounted to the base 10. A double-acting hydraulic cylinder (not shown) extends between the carriage assembly 14 and the base 10 for actuating the carriage 14 to move transversely to the direction of a board as indicated by arrow B. The cabinet includes a suitable hydraulic pump and fluid reservoir coupled to the cylinder. The cylinder actuation is controlled by electrically actuated solenoid valves as described in conjunction with the description of FIG. 2.

A saw height adjustment 22 for vertically adjusting the position of saw blade 18 is coupled to a vertical height adjustment carriage comprising a pair of dovetailed brackets mounted on the downwardly depending forward lip 23 of carriage 14 and a slide plate 21 to which the saw motor is mounted. Once the vertical height is adjusted to its desired position, set screws 31 are secured to lock the vertically adjustable carriage in position.

Extending outwardly to the right and behind support platform 11 is a control panel 24 including a pair of push button switches 25 and 26 spaced from one another and surrounded by protective shields 27 preventing actuation of the switches inadvertently or by use of a shorting board but permitting operator actuation of the palm switches by the operator. Additionally there is included on the control panel 24 a key operated on-off master power switch 17 and saw motor start and stop switches 28 and 29, respectively. Centrally located on carriage 14 is a display panel 30 including a plurality of display lights identified and described in conjunction with the control circuit shown in FIG. 2. A pair of electrical cables 32 and 34 couple the control panel 24 and electrical control circuit therein to the solenoid valves for the hydraulic system located in the carriage assembly 14.

The control circuit shown in FIG. 2 includes a power transformer 40 having a primary winding 42 coupled to a supply of alternating voltage current via terminals L1 and L2. Transformer 40 includes a secondary winding 44 having one output 45 forming the AC common conductor for the system. The remaining output 47 is coupled to transformer secondary winding 44 by means of a fuse 46 and together with conductor 45 to the input of a 12 volt DC power supply circuit 50. Circuit 50 is of conventional design and includes a common output terminal 52 serving as the system ground and a 12 volt DC output +V which is coupled to the various logic circuits as shown in the diagram for supplying operating power to them.

A motor starting solenoid 54 is coupled to the saw motor 16 for selectively applying operating power thereto. Starter 54 has a plurality of starting contacts 56 and is coupled between the AC common line 45 and output 47 by means of a solid state relay 58. Coupled in parallel with the motor starter is an indicator light 55 actuated when the motor is actuated to indicate the running status of the motor. A motor-off light 57 is coupled in series with a normally closed motor starting contact 57' and is illuminated when the saw motor is deactuated. The motor starting solenoid 54 is actuated by the solid state relay 58 which includes a control input terminal 59, a 110 volt input terminal 60 coupled to the 110 volt line 47 and 110 volt output terminal 61 coupled to the motor starter 54. Terminal 62 is coupled to the system ground. The solid state relay 58 is controlled by an output signal from terminal 3 of flip-flop circuit 65 which is formed by conventionally cross-coupled NAND gates 66 and 68. The output terminal 3 of gate 66 provides a logic '1' output signal to actuate solid state relay 58 and actuate the motor 16 in response to a logic '0' applied to input terminal 1 thereof. A logic '1' is normally applied to input terminal 6 of gate 68 as a result of the output of NAND gate 72 having a logic '0' applied thereto by the normally closed saw stop switch 29. Flip-flop 65 is controlled by switches 28, 29 and 74 as now described.

Before the saw motor 16 is actuated, the saw carriage 14 will be in its extreme rearward position as shown in FIG. 1 opening an at rest solid state limit switch 74. Switch 74 is supplied operating power from the +V source and has its input coupled to ground and its output coupled to +V through resistor 79. When closed its output therefor is a logic '0' and when open a logic '1'. In this position of the saw carriage therefore input 12 of NAND gate 77 has a logic '1' applied to it from switch 74 through a pair of serially coupled inverters 75 and 76. The solid state saw start switch 28 has an input coupled to ground and an output coupled to +V through resistor 80. When the saw start switch is momentarily actuated by the operator to initiate operation of saw motor 16, therefore switch 28 applies a logic '0' to inverter 79 which in turn applies a logic '1' to the remaining input terminal 13 of gate 77. Gate 77 responds to provide a logic '0' applied to input terminal 1 of flip-flop 65 to actuate starter 54. Thus in order to start the motor, the saw must be in the extreme rearward position to actuate flip-flop 65 which remains at a logic '1' output until the saw stop switch 29 is momentarily actuated. An inverter 70 coupled to output 4 of flip-flop 65 actuates an indicator light 71 through a series coupled resistor 73 to provide an indicator light of motor actuation. Capacitor 69 coupled between pin 5 of gate 68 and ground also assures that the motor 16 will not be inadvertently actuated when the power is first applied to the system. It accomplishes this by setting flip-flop 65 in its at rest state with a '0' on pin 5 and on the output pin 3.

The solid state saw stop switch 29 is coupled to the +V power supply and ground. Its output is coupled to the +V supply through resistor 73 such that when actuated it will open and provide a logic '1' output signal applied to the input of gate 72. When the saw stop switch 29 is momentarily actuated and thereby opened, the input of gate 72 goes to a logic '1' state applying a logic '0' to pin 6 of gate 68 changing the state of flip-flop 65 to a logic '0' output on pin 3 of gate 66 to deactuate the motor 16 through relay 58 and motor starter 56. This also extinguishes indicator light 71.

Having described the saw motor operation and the safety feature whereby the saw can only be actuated when the saw carriage is in its rearward position, a description of the timing circuit with respect to the operation of the cycle switches 25 and 26 is now described.

The forward motion of the saw carriage 14 and the rotating saw blade 18 thereon is controlled by a forward valve operating solenoid 82 having one terminal coupled to the system common line 45 and its remaining terminal coupled to the output 85 of a solid state relay 84. Relay 84 includes a second output terminal 86 coupled to the AC supply line 47 and a control input terminal 87. Relay 84 further includes terminal 88 coupled to the system ground. A cycle forward indicator lamp 83 is coupled in parallel with the forward solenoid and is actuated when the solenoid is actuated indicating that the saw is in its forward motion. Solid state relay 84 provides 110 volt power output to terminal 85 and solenoid 82 only when a logic '1' is applied to input terminal 87 which occurs, as described below, only when the two cycle switches 25 and 26 are nearly simultaneously actuated.

A reverse solenoid 92 also coupled to a hydraulic valve for reversing the motion of saw carriage 14 also has one terminal coupled to the AC common line 45 with the remaining terminal coupled to output terminal 95 of an additional solid state relay 96. Relay 96 also includes a control input terminal 97, a 110 volt AC input terminal 98 and a terminal 99 coupled to the system ground. As will be described hereinafter in greater detail, when a logic '1' is applied to relay 96 which can be caused either by the actuation of a forward limit solid state switch 100 or by the deactuation of one of the cycle switches 25 and 26 which occurs concurrently with a logic '0' being applied to input terminal 87 of relay 84 the reverse solenoid 92 is actuated to reverse the direction of motion of the saw carriage until the at rest limit switch 74 is opened. In describing a cycle of operation, first the initiation of the forward cycle will be described followed by a description of the reverse cycle of operation.

Either of switches 25 or 26 can be actuated first to initiate movement of the saw as long as both of the switches are actuated nearly simultaneously. Switches 25 and 26 are solid state switches each coupled to the +V source for operating power and having an input coupled to system ground. Their outputs are coupled to +V through resistors 111 and 107, respectively. Switch 25 is normally biased in an open position while switch 26 is normally closed. Assuming for purposes of this description only that switch 25 is first actuated, its closure provides a logic '0' output applied to the input of inverter 102 which in turn applies a logic '1' to input 4 of a one-shot multivibrator circuit 104. The output of inverter 102 is also coupled to indicator lamp 103 through a suitable current limiting resistor 105 to indicate that switch 25 has been actuated. Circuit 104 has a time constant of approximately 220 milliseconds determined by the RC time constant of resistor 103 (56 K ohms) and capacitor 105 (3.9 μ FD) coupled as shown in FIG. 2. Upon receipt of a logic '1' pulse on input terminal 4, output terminal 6 of one-shot 104 develops an output pulse as shown by a waveform 106 of approximately 220 milliseconds duration which is applied to input terminal 2 of NAND gate 110. At the same time the logic '1' applied to input terminal 4 of the one-shot is also applied to input terminal 3 of gate 110. Pin 3 of the commercially available one-shot 104 is coupled to the output of inverter 76 and remains at a logic '1' state to enable the one-shot only when the saw carriage 14 is in its rearward position. Thus if the saw carriage is initially advanced from its rearward position, one-shot 104 will not be enabled and will not respond to a logic '1' applied to input terminal 4 to develop pulse 106. This subsequently, as described below, prevents actuation of the forward solenoid and advancement of the saw carriage. The output of gate 76 is also applied to terminal 13 of one-shot 112 for the same purpose.

NAND gate 110 includes two additional inputs 4 and 5, input 4 of which is coupled to the output of the second cycle push button switch 26 which provides a logic '1' output when actuated by virtue of its interconnection to the +V power supply through resistor 107. A pair of inverter amplifiers 108 and 109 couple this logic '1' signal to input 4 of NAND gate 110. The output of inverter 109 is also applied to an indicator lamp 111 through a current limiting resistor 113 to indicate that switch 26 has been actuated.

The one-shot multivibrator 112 has an input terminal 12 coupled to the output of inverter 109 as shown. The time constant of multivibrator 112 likewise is approximately 220 milliseconds determined by the RC time constant of resistor 114 and capacitor 116 coupled as shown in the Figure. The output pulse waveform 115 is shown adjacent output terminal 10 and is applied to the remaining input 5 of NAND gate 110. NAND gate 110 will provide a logic '0' at its output terminal 1 only when each of input terminals are at a logic '1' state. This occurs only when the delay pulses 106 and 115 initiated upon actuation of the switches 25 and 26, respectively, overlap. Thus only when the cycle switches 25 and 26 are actuated within 220 milliseconds of one another will the NAND gate 110 provide a logic '0' output, inverted by inverter 118 to apply a logic '1' to input 1 of an additional NAND gate 120.

The remaining input terminal 8 of NAND gate 120 is coupled to the saw motor output signal (logic '1') from pin 5 of flip-flop 65. Thus if the saw motor is running and switches 25 and 26 are nearly simultaneously actuated, gate 120 provides a logic '0' output signal applied to pin 1 of a second flip-flop circuit 130. Circuit 130 is conventionally fabricated of cross-coupled NAND gates 136 and 138. It responds to an input '1' on pin 1 to provide a logic '1' output signal applied to input terminal 87 of relay 84. As noted above, relay 84 responds to such signal to actuate the forward solenoid 82. The logic '1' output on pin 3 of circuit 13 provides a logic '0' output on pin 13 applied to inverter 131 the output of which is coupled to a cycle forward indicator lamp 132 through a current limiting resistor 133 to indicate the duration of the forward cycle of operation.

During the board cutting operation the operator continues to hold switches 25 and 26 in their depressed state. Since flip-flop circuit 130 has changed states and is in a different stable condition, despite the fact the pulses 106 and 115 are only momentary, state relay 84 remains actuated to continue the forward motion of saw 16. In the event the operator releases one of the buttons either purposefully because a board is completely cut or for any other reason, the following logic circuitry operates to initiate the reverse cycle of operation of the circuit.

When switches 25 and 26 are actuated and held down by the operator, logic '1' output signals from inverters 102 and 109, respectively, are also applied to the input terminals 8 and 9, respectively, of NAND gate 140. Gate 140 provides a logic '0' output applied to the input 5 of NAND gate 142 having its remaining input terminal 6 coupled to the output of inverter 75. The output of inverter 75 is at a logic '1' state since the cycle of operation has been initiated and switch 74 closed. Thus with a '0' on its input NAND gate 142 provides a logic '1' output applied to pin 3 of a third flip-flop circuit 150 comprising cross-coupled NAND gates 152 and 154. With a logic '1' applied to on input terminal 3, flip-flop 150 remains at a stable state with a logic '0' output from pin 6.

When, however, either of switches 25 or 26 is released during saw motion, circuit 140 outputs a logic '1' in turn causing the output of gate 142 to switch to a logic '0' thereby actuating flip-flop 150 to output a logic '1' to pin 97 of the reverse solenoid 96 causing its actuation. Simultaneously, the logic '0' output from gate 142 is applied to pin 10 of flip-flop 130 causing its state to change to a logic '0' output deactuating the forward solenoid 82 through solid state relay 84. With a logic '1' output at pin 6 of flip-flop 150, output 10 is at a logic '0' state which signal is applied to an inverter 152 and subsequently to the reverse cycle indicating lamp 153 through the current limiting resistor 154 to indicate actuation of the reverse cycle.

In order to prevent the inadvertent actuation of reverse solenoid 92 during a forward cycle of operation, a logic '0' output from pin 13 of flip-flop 130 is also applied to input terminal 12 of flip-flop 150 holding it in its logic '0' output state until one of the cycle buttons is deactuated. Once the saw has returned to its at rest initial position, switch 74 is deactuated providing a logic '0' output signal from inverter 75 applied to pin 13 of flip-flop 150. This changes the state of the flip-flop to output a logic '0' thereby deactuating the reverse solenoid 92 through relay 96. The system is then in its at rest position having completed a cycle of operation and will not recycle until switches 25 and 26 are again actuated.

In the event that during the forward cycle of operation the operator does not release the push buttons but instead the saw continues its travel until it actuates the forward limit switch 100, limit switch 100 provides a logic '1' output by disconnecting the junction of resistor 101 from the +V supply to ground through the switch. This logic '1' signal is inverted by circuit 156 to provide a logic '0' signal applied to pin 11 of flip-flop 130 and to pin 4 of flip-flop 150. The logic '0' applied to these flip-flops causes them to reverse states and deactuate the forward solenoid 82 and actuate the solenoid 92 as described above. The '0' output from gate 156 is also applied to a forward limit indicating light 159 through inverter circuit 158 and current limiting resistor 157. When the saw carriage has returned to its initial position, the cycle terminates as described above and an at rest lamp 136 coupled to the output of inverter 76 through current limiting resistor 137 is illuminated.

Thus it is seen that with the timing circuit including one-shot multivibrators 104 and 112 and the logic circuits the operator cannot hold one of the cycle switches down freeing a hand for possible use in manipulating boards entering the saw blade area thereby causing a potential hazard. Further, once the saw is actuated in the event the operator removes one of his hands from the push button switches, the saw will instantaneously return to its at rest position and out of the area of the board being cut. Also, by virtue of the enabling input to the timing circuit the cycling of the saw can be initiated only from the at rest position. Thus in the event the saw is partially forward thereby possibly causing a hazardous situation, it will not cycle unless returned to the at rest position manually before operation. Naturally it would not normally be in such a position due to the automatic circuit operation and could only be in such position, for example, if during maintenance it was left in a partially extended position.

It will become apparent to those skilled in the art that various modifications to the preferred embodiment of the present invention can be made without departing from the spirit and scope thereof as defined by the appended claims.

The embodiments of the invention in which an exclusive property or privilege is claimed are defined as follows:

1. A saw comprising:
   a carriage and controllable means for moving said carriage between a first retracted position and a second extended position;
   a sawing element mounted on said carriage and means for actuating said sawing element;
   a pair of spaced operator actuated push button switches for cycling said sawing element and carriage between said first and second positions;
   a control circuit including a timing circuit coupled to said pair of push button switches, said control circuit coupled to said controllable carriage moving means and responsive to the actuation of said push button switches for actuating said controllable carriage moving means only when said push button switches are simultaneously actuated and for returning said carriage to its first position whenever either one of said push button switches are released; and
   safety circuit means coupled to said means for actuating said sawing element such that said sawing element can be actuated only when said carriage is in said first position.

2. A saw comprising:
   a carriage and controllable means for moving said carriage between first and second positions;
   a sawing element mounted on said carriage;
   a pair of spaced operator actuated push button switches for cycling said sawing element and carriage between said first and second positions; and
   a control circuit including a timing circuit coupled to said pair of push button switches, said control circuit coupled to said controllable carriage moving means and responsive to the actuation of said push button switches for actuating said controllable carriage moving means only when said push button switches are simultaneously actuated, wherein said timing circuit comprises a pair of one-shot multivibrator circuits each having a control input terminal and an output terminal, each of said control input terminals coupled to a different one of said push button switches for providing at said output terminals an output pulse of predetermined duration in response to the actuation of said push button switches, and gate circuit means coupled to said output terminals of said one-shot multivibrators to provide a control output signal for actuation of said controllable carriage moving means only upon the coincident application of said output pulses from said one-shot multivibrators to said gate circuit means.

3. The saw as defined in claim 2 wherein said controllable means for moving said carriage includes a first solenoid for actuating said carriage in a first direction and a second solenoid for actuating said carriage in an opposite direction and first and second latching circuit means coupled from said gate circuit means to said first and second solenoids respectively for the selective actuation of said solenoids to cycle said carriage between said first and second positions.

4. The saw as defined in claim 3 wherein said gate circuit means includes a four input NAND gate having a pair of input terminals coupled to said push button switches and a pair of input terminals coupled to said output terminals of said one-shot multivibrators for developing an output signal applied to said first latching circuit means to actuate said first solenoid in response to predetermined input signals on all input terminals of said four input NAND gate.

5. The saw as defined in claim 4 wherein said gate circuit means further includes a two input NAND gate having a pair of input terminals coupled to said push button switches and an output terminal coupled to said first and second latching circuit means for actuating said second solenoid and deactuating said first solenoid in the event at least one of said push button switches is released by the operator.

6. The saw as defined in claim 5 and further including a first limit switch actuated when said carriage is in said first position and wherein said one-shot multivibrators include an enabling input coupled to said first limit switch and responsive to the actuation of said first limit switch for enabling the operation of said one-shot multivibrators only when said carriage is in said first position.

7. The saw as defined in claim 6 and further including a second limit switch actuated when said carriage is in said second position and coupled to said second latching circuit means for actuating said second solenoid when said carriage is in said second position.

8. For use in a machine employing a pair of spaced operator actuated push button switches to initiate a cycle of operation of the machine, an improved control circuit comprising:
   a timing circuit having input terminals for coupling to the operator actuated push button switches and responsive to the actuation thereof to provide a control signal at an output terminal thereof only when the push button switches are both actuated within a predetermined time period;
   logic circuit means for coupling to the push button switches and to said output terminal of said timing circuit for providing machine command signals at an output thereof for initiating a cycle of operation of the machine in response to the receipt of said control signal and signals from said push button switches indicating that they have been actuated for interrupting said command signal in the event either one of the push button switches is released before a cycle of machine operation is completed.

9. For use in a machine employing a pair of spaced operator actuated push button switches to initiate a cycle of operation of the machine, an improved control circuit comprising:

a timing circuit comprising a pair of one-shot multivibrator circuits each having a control input terminal and an output terminal, each of said control input terminals coupled to a different one of said push button switches for providing at said output terminal an output pulse of predetermined duration in response to the actuation of said push button switches within a predetermined time period;

logic circuit means for coupling to the push button switches and to said output terminal of said timing circuit for providing machine command signals at an output thereof for initiating a cycle of operation of the machine in response to the receipt of said control signal and for interrupting said command signal in the event at least one of the push button switches is released before a cycle of machine operation is completed.

10. The circuit as defined in claim 9 wherein said logic circuit means comprises gate circuit means coupled to said output terminals of said one-shot multivibrators to provide an output signal only upon the coincident application of said output pulses from said one-shot multivibrators to said gate circuit means.

11. The circuit as defined in claim 10 and further including a first solenoid for actuating a machine element in a first direction and a second solenoid for actuating the machine element in an opposite direction and first and second latching circuit means coupled from said gate circuit means to said first and second solenoids respectively for the selective actuation of said solenoids to cycle the machine element between the first and second positions.

12. The circuit as defined in claim 11 wherein said gate circuit means includes a four input NAND gate having a pair of input terminals coupled to the push button switches and a pair of input terminals coupled to said output terminals of said one-shot multivibrators for developing an output signal applied to said first latching circuit means to actuate said first solenoid in response to predetermined input signals on all input terminals of said four input NAND gate.

13. The circuit as defined in claim 12 wherein said gate circuit means further includes a two input NAND gate having a pair of input terminals coupled to the push button switches and an output terminal coupled to said first and second latching circuit means for actuating said second solenoid and deactuating said first solenoid in the event at least one of the push button switches is released by a machine operator.

* * * * *